(12) United States Patent
Liebler et al.

(10) Patent No.: US 9,443,619 B2
(45) Date of Patent: Sep. 13, 2016

(54) STRIP FOR A NUCLEAR FUEL ASSEMBLY SPACER GRID

(75) Inventors: Michael Liebler, Heilsbronn (DE); Werner Meier, Kunreuth (DE)

(73) Assignee: AREVA NP, Courbevoie (FR)

( * ) Notice: Subject to any disclaimer, the term of this patent is extended or adjusted under 35 U.S.C. 154(b) by 227 days.

(21) Appl. No.: 13/822,567

(22) PCT Filed: May 14, 2012

(86) PCT No.: PCT/EP2012/058904
§ 371 (c)(1),
(2), (4) Date: Aug. 16, 2013

(87) PCT Pub. No.: WO2012/159913
PCT Pub. Date: Nov. 29, 2012

(65) Prior Publication Data
US 2014/0072091 A1    Mar. 13, 2014

(30) Foreign Application Priority Data
May 20, 2011 (EP) .................................... 11305629

(51) Int. Cl.
*G21C 3/356* (2006.01)
*G21C 3/352* (2006.01)
*G21C 3/322* (2006.01)

(52) U.S. Cl.
CPC ............... *G21C 3/352* (2013.01); *G21C 3/322* (2013.01); *G21C 3/356* (2013.01); *G21C 3/3563* (2013.01); *Y02E 30/38* (2013.01)

(58) Field of Classification Search
USPC ....................................................... 376/462
See application file for complete search history.

(56) References Cited

U.S. PATENT DOCUMENTS

| | | | |
|---|---|---|---|
| 3,844,887 A | 10/1974 | Gorges et al. | |
| 4,163,690 A | 8/1979 | Jabsen | |
| 4,702,881 A | 10/1987 | Weiland et al. | |
| 4,933,138 A | 6/1990 | Mouesca et al. | |
| 4,957,697 A | 9/1990 | Wada | |
| 5,180,548 A * | 1/1993 | Verdier ................. | G21C 3/322 376/438 |
| 5,331,678 A | 7/1994 | Hatfield et al. | |
| 5,966,419 A | 10/1999 | Petit | |

(Continued)

FOREIGN PATENT DOCUMENTS

| | | |
|---|---|---|
| CN | 86102224 A | 11/1986 |
| CN | 101055775 A | 10/2007 |
| JP | H01-173898 A | 7/1989 |
| JP | S64-065491 | 10/1989 |

(Continued)

OTHER PUBLICATIONS

International Search Report for corresponding International Application PCT/EP2012/058904.

*Primary Examiner* — Sean P Burke
(74) *Attorney, Agent, or Firm* — Davidson, Davidson & Kappel, LLC

(57) ABSTRACT

The strip is of the type comprising a wall portion for delimiting a cell for receiving a fuel rod and allowing flow of a coolant upwardly through the spacer grid, a spring provided on the wall portion for biasing a fuel rod extending through the cell away from the wall portion, the spring being cut out in the strip and delimited by a slot and a motion limiter formed in the strip on the wall portion to limit motion of a fuel rod received in the cell towards the wall portion against action of the spring. According to one aspect of the invention, the motion limiter is located on an edge of the slot opposite the spring and defines a risen portion on the edge.

12 Claims, 8 Drawing Sheets

(56) References Cited

U.S. PATENT DOCUMENTS

| | | |
|---|---|---|
| 6,278,759 B1 | 8/2001 | Yoon et al. |
| 2003/0012329 A1 | 1/2003 | Yoon et al. |
| 2007/0242793 A1 | 10/2007 | Song et al. |

FOREIGN PATENT DOCUMENTS

| | | |
|---|---|---|
| JP | H02-021597 A | 1/1990 |
| JP | H02-021597 U | 2/1990 |
| JP | H02-257092 | 10/1990 |

* cited by examiner

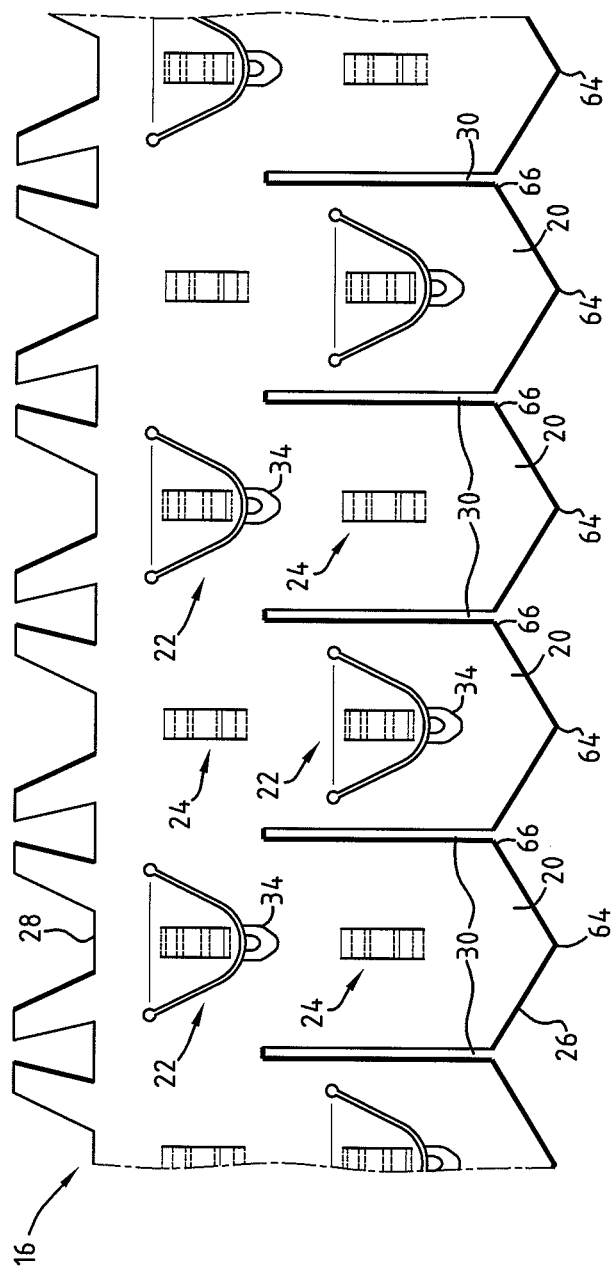

STRIP FOR A NUCLEAR FUEL ASSEMBLY SPACER GRID

The present invention relates to a strip for a nuclear fuel assembly spacer grid comprising interlaced strips defining a lattice of cells for receiving fuel rods and allowing flow of a coolant in a flow direction, the strip being of the type comprising a wall portion for delimiting a cell, a spring formed in the strip and provided on the wall portion for biasing the fuel rod extending through the cell away from the wall portion, the spring being cut out in the strip and delimited by a slot, and a motion limiter formed in the strip on the wall portion to limit motion of the fuel rod received in the cell towards the wall portion against action of the spring.

BACKGROUND

U.S. Pat. No. 4,879,090 illustrates on FIG. 5 thereof a peripheral strip for a nuclear fuel assembly spacer grid, the peripheral strip comprising wall portions to delimit cells and on each wall portion a spring formed by a tab cut out in the strip and motion limiters formed as a pair of bosses embossed in the strip at a distance from the tab.

In operation, a coolant fluid (e.g. water) flows axially upwardly through the cells of the spacer grid. The spring and the motion limiters provided on each wall portion protrude from the plane of the wall portion towards the center of the same cell delimited by the wall portion and partially obstruct the coolant fluid flow channel.

SUMMARY OF THE INVENTION

An object of the invention is to provide a strip for a nuclear fuel assembly spacer grid limiting the flow resistance of the spacer grid whilst allowing suitable support for the nuclear fuel rods during the whole fuel assembly lifetime and good manufacturability.

To this end, a strip for a nuclear fuel assembly spacer grid of the above-mentioned type is provided, wherein the motion limiter is located on an edge of the slot opposite the spring and defines a risen portion on the edge.

In other embodiments, the strip comprises one or several of the following features, taken in isolation or in any technically feasible combination:

- the motion limiter is provided upstream the spring in the coolant flow direction through the cell delimited by the wall portion;
- the motion limiter enlarges towards the edge of the slot;
- the motion limiter rises from the wall portion towards the edge of the slot;
- the motion limiter is a bulge;
- the spring comprises a cantilevered tab;
- the tab extends downwardly in cantilevered fashion towards an upstream lower edge of the strip;
- the slot is an elongated curved slot, the tab being delimited between the slot and a connection line joining two opposite ends of the slot;
- the spring comprises a contact portion at least partially formed in the tab to contact the fuel rod received in the cell; and
- the contact portion is elongated in the flow direction.

The invention also relates to a spacer grid comprising interlaced strips defining a lattice of cells for receiving fuel rods and allowing flow of a coolant axially upwardly through the spacer grid, at least one of the interlaced strips being a strip as defined above.

The invention further relates to a nuclear fuel assembly comprising a bundle of fuel rods and an armature for supporting the fuel rods, the armature comprising at least one spacer grid as defined above.

BRIEF SUMMARY OF THE DRAWINGS

The invention and its advantages will be better understood on reading the following description given solely by way of example and with reference to the appended drawings, in which:

FIG. 10 is a front view of a strip of still another embodiment of the invention.

DETAILED DESCRIPTION

Figure 1:
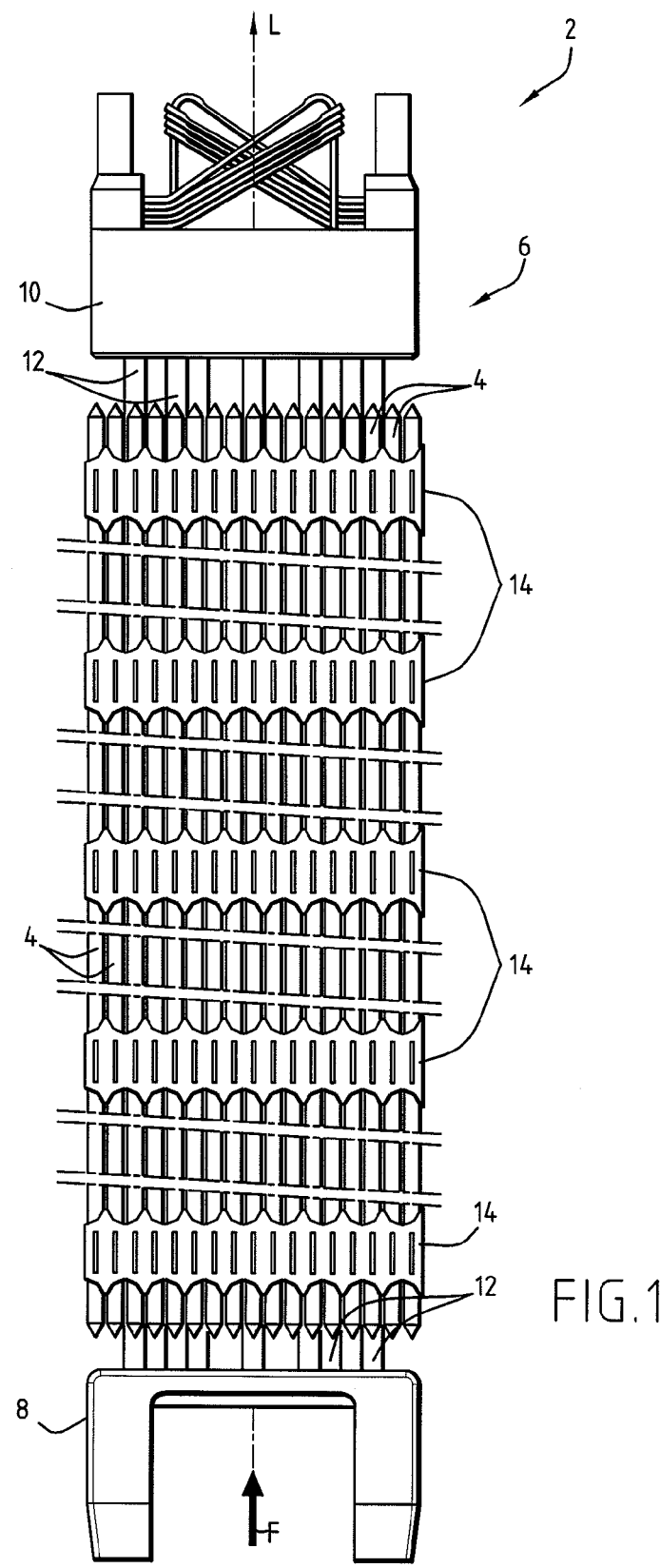
FIG. 1 is a side elevation view of a pressurized water reactor nuclear fuel assembly having spacer grids made of interlaced strips.

The nuclear fuel assembly 2 for a pressurized water reactor (PWR) illustrated on FIG. 1 comprises a bundle of nuclear fuel rods 4 and an armature 6 for supporting the fuel rods 4. The PWR fuel assembly 2 is elongated along an assembly axis L extending vertically when the fuel assembly 2 is disposed inside a nuclear reactor.

The armature 6 comprises a lower nozzle 8, an upper nozzle 10, a plurality of guide-tubes 12 and a plurality of spacer grids 14.

The guide-tubes 12 extend parallel to assembly axis L and connect the lower nozzle 8 to the upper nozzle 10 and maintain a predetermined spacing along assembly axis L between the nozzles 8, 10. Each guide-tube 12 opens upwards through the upper nozzle 10 for allowing insertion of a control rod into the guide-tube 12.

Figure 2:
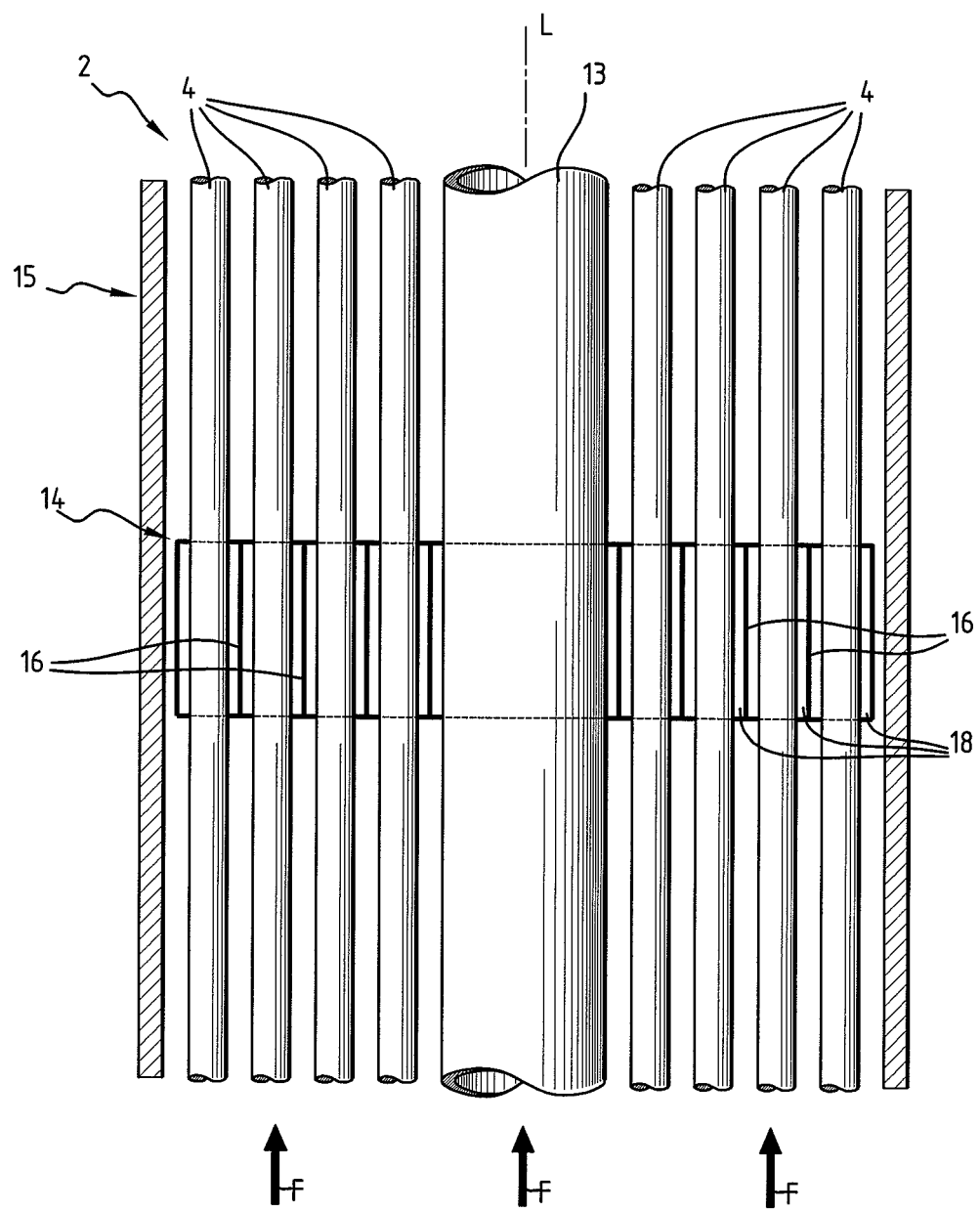
FIG. 2 is a partial sectional side view of a boiling water reactor nuclear fuel assembly having spacer grids made of interlaced strips.

The nuclear fuel assembly 2 for a boiling water reactor (BWR) illustrated on FIG. 2 is also elongated along an assembly axis L extending vertically when the fuel assembly 2 is disposed inside a nuclear reactor.

The BWR fuel assembly 2 comprises a bundle of nuclear fuel rods 4, an armature for maintaining the fuel rods 4 and a tubular fuel channel 15 surrounding the bundle of fuel rods 4. The armature typically comprises a lower nozzle and an upper nozzle spaced along assembly axis L, at least one water channel 13 arranged within the bundle of fuel rods 4 and a plurality of spacer grids 14 distributed along the bundle of fuel rods 4.

The fuel rods 4, the water channel 13 and the fuel channel 15 extend between the lower nozzle and the upper nozzle, with the water channel 13 and the fuel channel 15 connecting the lower nozzle and the upper nozzle.

The water channel 13 extends parallel to the fuel rods 4. The water channel 13 is arranged for channeling a coolant/moderator flow separately from the bundle of fuel rods 4.

The fuel channel 15 extends parallel to the fuel rods 4. The fuel channel 15 encases the bundle of fuel rods 4 and the water channel 13. The fuel channel 15 is arranged for channeling a coolant/moderator flow between and about the fuel rods 4.

The PWR and BWR spacer grids 14 are distributed in spaced relationship along the fuel rods 4.

Each spacer grid 14 extends transversely to the assembly axis L.

Each fuel rod 4 comprises a tubular cladding, pellets of nuclear fuel stacked inside the cladding and caps closing the ends of the cladding. Each fuel rod 4 extends parallel to assembly axis L through the spacer grids 14 with being supported transversely and longitudinally relative to assembly axis L by the spacer grids 14.

In operation, the fuel assembly 2 is placed in a nuclear reactor with the lower nozzle 8 resting on a bottom plate of the reactor and the assembly axis L being substantially vertical. A coolant flows upwardly along the fuel assembly 2 with flowing between the fuel rods 4 and through the nozzles 8, 10 and the spacer grids 14 as illustrated by arrows F on FIGS. 1 and 2.

The spacer grids 14 may be similar to each other and one spacer grid 14 according to the invention will be further described with reference to FIGS. 3-7.

Figure 3:
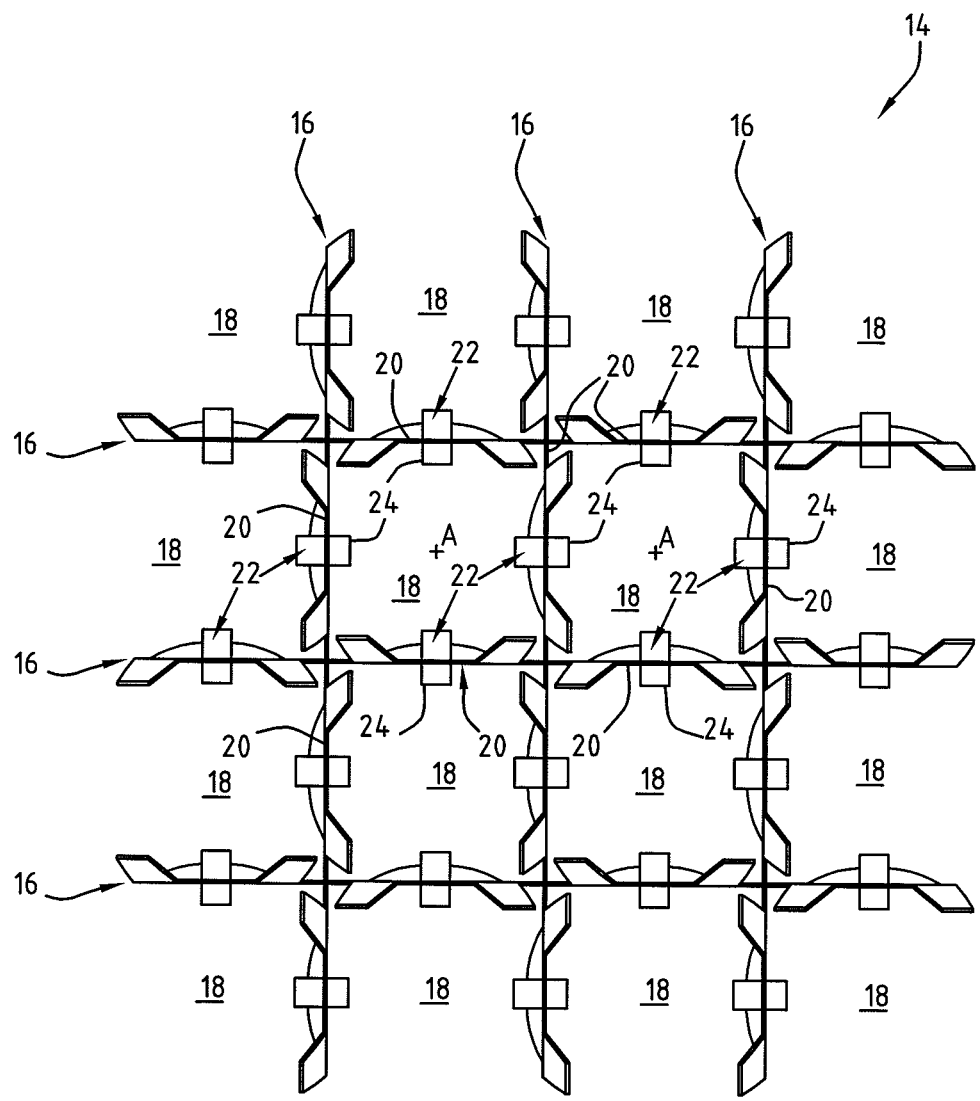
FIG. 3 is a partial top view of a spacer grid according to the invention.

As illustrated on FIG. 3, the spacer grid 14 comprises a plurality of interlaced metallic strips 16 defining a lattice of cells 18 each for receiving one fuel rod 4, only a few cells 18 being illustrated on FIG. 3.

In a known manner, in the case of a spacer grid for a PWR fuel assembly, the interlaced strips 16 also define a plurality of cells for receiving PWR guide-tubes 12, the spacer grid 14 being secured to the guide-tubes 12, e.g. by welding. Similarly, in the case of a spacer grid for a BWR fuel assembly, the at least one BWR water channel 13 typically replaces one or several fuel rods 4 in the lattice, the interlaced strips 16 define an aperture for the water channel 13 and the spacer grid 14 is secured to the water channel 13, e.g. by welding.

Only cells 18 for receiving fuel rods 4 are illustrated on FIG. 3 and in the following, the term "cell" refer to the cells 18 for receiving fuel rods 4.

Each cell 18 is tubular and extends along a cell axis A. The cell axis A is to be parallel to the assembly axis L (perpendicular to FIG. 3) when the spacer grid 14 is assembled in the fuel assembly 2 (FIGS. 1 and 2). The cell axes A of the different cells 18 are parallel. Each cell 18 is delimited by four wall portions 20 of two pairs of intersecting strips 16, the strips 16 of each pair extending parallel to one another.

One wall portion 20 of each pair of opposite wall portions 20 delimiting a cell 18 has an elastic spring 22 formed in the wall portion 20 and protruding in a free state towards the center of the cell 18, and the other wall portion 20 of each pair of opposite wall portions 20 has a rigid dimple 24 formed in the wall portion 20 and protruding towards the center of the cell 18.

The springs 22 and dimples 24 provided on the wall portions 20 of each cell 18 are arranged such that a fuel rod 4 extending through the cell 18 is biased transversely by the springs 22 against the dimples 24 to support the fuel rod 4 transversely and longitudinally relative to the cell axis A.

Each wall portion 20 delimiting two adjacent cells 18 (one on each side of the strip 16) has a spring 22 protruding on a face of the wall portion 20 in one of the cells 18 and a dimple 24 protruding on the opposite face of the wall portion 20 in the other cell 18. Each wall portion 20 delimiting only one cell 18 has either a spring 22 or a dimple 24.

Figure 4:
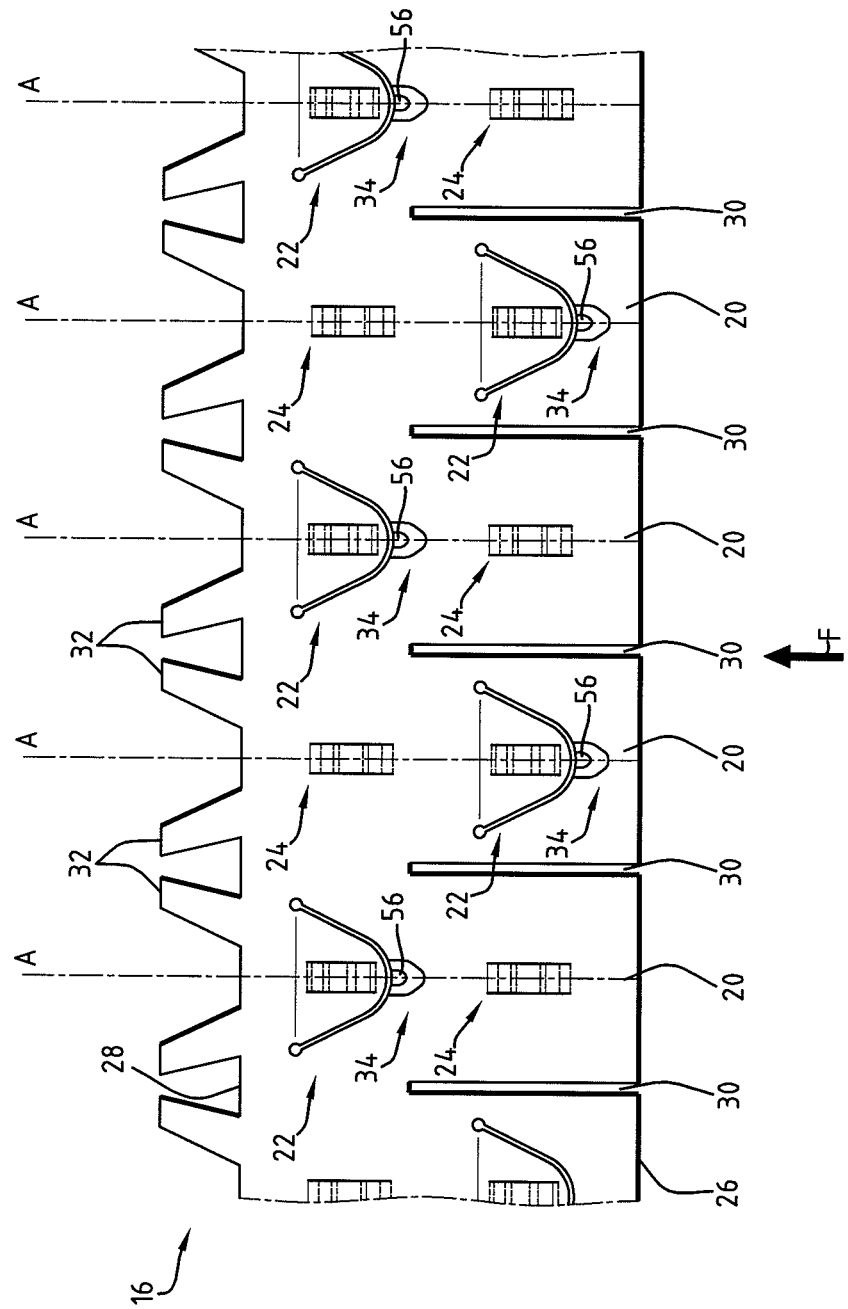
FIG. 4 is a partial front view of a strip of the spacer grid of FIG. 3.

FIG. 4 illustrates a plurality of the wall portions 20 of a strip 16, each of these wall portions 20 being adapted to delimit two cells 18, one on each side of the strip 16.

In operation, the coolant flows upwardly through each cell 18 in the flow direction F represented on FIG. 4 from an upstream lower edge 26 to a downstream upper edge 28 of the strip 16. The flow direction F is parallel to the cell axis A.

Each wall portion 20 extends from the lower edge 26 to the upper edge 28. The wall portions 20 are separated by slits 30 provided on the lower edge 26 and extending substantially to the half-height of the strip 16 for engagement with a series of corresponding slits 30 provided on the upper edge 28 and extending substantially to the half-height of an intersecting strip 16.

The strip 16 optionally comprises fins 32 protruding upwardly from the upper edge 28, each fin 32 being inclined relative to the cell axis A for imparting helical motion to the coolant fluid flowing through the cells 18 and enhancing heat exchange between the coolant and the fuel rods 4.

The strip 16 comprises on each of the illustrated wall portions 20 a spring 22, a dimple 24 and a motion limiter 34 each formed in the strip 16 and thus integrally one-piece with the strip 16.

The spring 22 and the motion limiter 34 provided on each wall portion 20 protrude on the same face of the strip 16, whereas the dimple 24 protrudes on the opposite face of the strip 16.

The dimples 24 are alternately disposed below and above the springs 22 on the adjacent wall portions 20. Interlaced strips 16 thus can be arranged such that a spring 22 provided on a wall portion 20 of a strip 16 delimiting a cell 18 faces a dimple 24 provided on the opposite wall portion 20 of another strip 16 delimiting the cell 18.

The springs 22 of the strip 16 are identical and one spring 22 is further described with reference to FIGS. 5-7.

Figure 5:
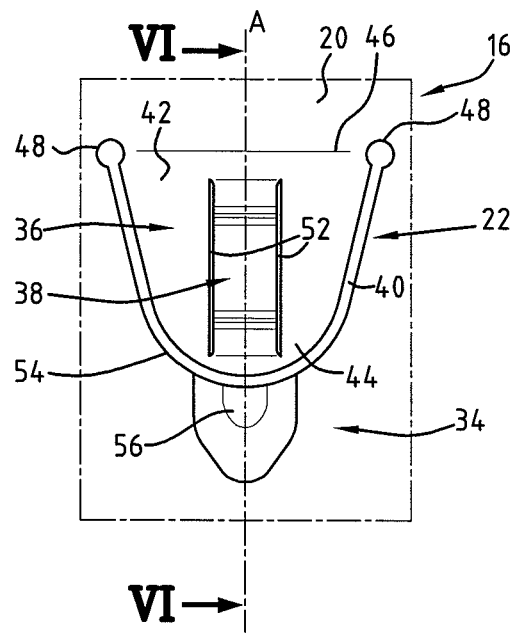
FIG. 5 is a front view of a spring and an associated motion limiter of the strip of FIG. 4.

The spring 22 illustrated on FIG. 5 comprises a flexible cantilevered tab 36 and a contact portion 38 cut out in the strip 16.

The tab 36 is delimited in the strip 16 by an elongated curved slot 40 of closed contour. The tab 36 is delimited between the slot 40 and the connection line 46 joining the opposed ends 48 of the slot 40. The ends 48 are preferably circular and enlarged to limit local mechanical peak stresses. The line 46 is perpendicular to the cell axis A. The tab 36 is connected to the wall portion 20 along the line 46.

The tab 36 extends downwardly in cantilevered fashion towards the upstream lower edge 26 and has an upper base 42 connected to the wall portion 20 and a lower free tip 44. The tab 36 is converging towards the free tip 44. The slot 40 is generally U-shape with diverging branches (or V-shape with a rounded tip).

In a free state of the spring 22, the tab 36 is inclined relative to the wall portion 20 and extends downwardly and away from the wall portion 20 towards the center of the cell 18 delimited by the wall portion 20. The tab 36 is elastically flexible by elastic deformation of the tab 36 with rotation of the tab 36 around a rotation axis substantially coinciding with the line 46. The flexibility of the tab 36 can be adjusted by adjusting the diameter of the ends 48 of the slot 40.

The contact portion 38 is formed exclusively in the tab 36 and protrudes from the tab 36 opposite the wall portion 20 and towards the center of a cell 18 delimited by the wall portion 20. The contact portion 38 is integrally one-piece with the tab 36.

The contact portion 38 is provided in the form of an arched bridge cut out in the tab 36. The contact portion 38 is elongated in the direction of the cell axis A, the two ends of the contact portion 38 connected to the tab 36 being aligned in the direction of the cell axis A. The contact portion 38 is formed as a lancing 50 delimited between two openings 52 extending substantially parallel to each other in the direction of the cell axis A.

The motion limiter 34 associated to the spring 22 is formed in the strip 16 along the edge 54 of the slot 40 opposite to the tab 36. The motion limiter 34 defines a risen portion 56 on the edge 54 of the slot 40.

The motion limiter 34 is a bulge formed in the strip 16 and protruding from the wall portion 20 on the same side than the corresponding spring 22.

The motion limiter 34 is disposed below the spring 22 and is thus upstream the spring 22 in a cell 18 delimited by the wall portion 20. The motion limiter 34 is profiled to define a fluid deflector for diverging coolant away from the spring 22 disposed in the slipstream of the motion limiter 34.

To this end, the motion limiter 34 is profiled to rise from the wall portion 20 and to enlarge transversely to the cell axis A towards the edge 54 in the downstream upward direction. The motion limiter 34 comprises e.g. a lower tip-like nose pointing upstream and raising end enlarging downstream, and an upper section of constant cross section extending the nose in the downstream direction up to the edge 54.

Figure 7:
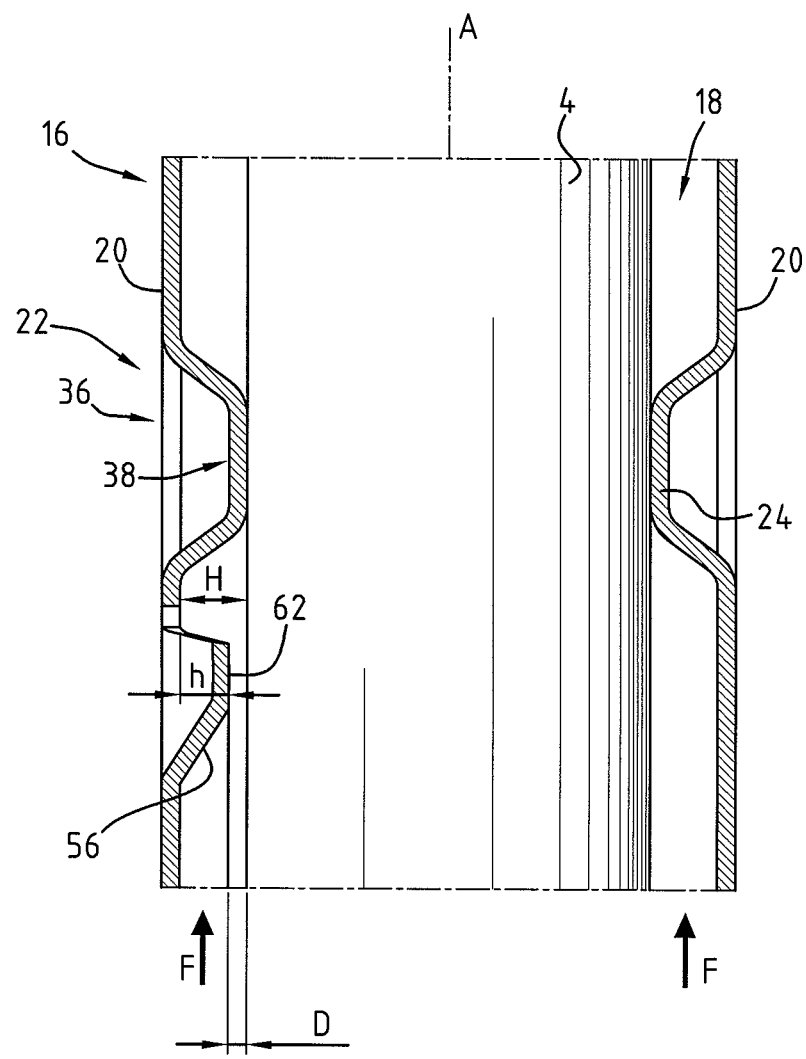
FIG. 7 is a partial sectional view of a cell of the spacer grid with a fuel rod extending through the cell.

As illustrated on FIG. 7, the contact portion 38 contacts the outer surface of a fuel rod 4 extending through a cell 18 delimited by the wall portion 20 with the tab 36 being elastically deformed towards the wall portion 20. The spring 22 thus biases the fuel rod 4 away from the wall portion 20 (toward the right on FIG. 7) in contact with a dimple 24 provided on the opposite wall portion 20 delimiting the cell 18.

In this configuration, the free tip 44 of the tab 36 extends substantially in the plane of the wall portion 20 and the height H of the contact portion 38 relative to the wall portion 20 is superior to the height h of the apex 62 of the motion limiter 34. There is a gap D between the apex 62 and the outer surface of the fuel rod 4.

In operation, the coolant flows through the cell 18 and around the fuel rod 4 upwardly at high speed in the flow direction F parallel to the cell axis A. This causes transverse vibration of the fuel rod 4 inside the cell 18. Transverse vibrations may also occur during transportation from manufacturing plant to power plant and during handling of the fuel assembly 2.

The motion limiter 34 is rigid and limits movements of a fuel rod 4 towards the wall portion 20 against the action of the spring 22. The motion limiter 34 thus avoids overstress of the spring 22 and namely plastic deformation thereof.

The spring 22 formed in the strip 16 with a flexible cantilevered tab 36 and a rigid contact portion 38 enables to bias the fuel rod 4 with an appropriate transverse force while limiting the flow resistance. The tab 36 furnishes the biasing force when the free tip 44 of the tab 36 is retracted in the plane (or nearly) of the wall portion 20; in this position only the contact portion 38 protrudes from the wall portion 20.

The contact portion 38 being elongated in the flow direction F enables to further limit the flow resistance and to provide an elongated contact zone with the fuel rod 4 for limiting fretting risks.

The spring 22, and namely the contact portion 38, is in the slipstream of the motion limiter 34. The motion limiter 34 disposed on the edge 54 at the nearest possible position to the spring 22 and profiled to limit fluid flow resistance contributes to limiting the overall flow resistance of the strip 16.

The motion limiter 34 provided on an edge 54 is obtainable by punching with limited energy to deform the strip 16. The strip 16 thus possesses a good manufacturability.

The spring 22 including the tab 36 and the contact portion 38 and the motion limiter 34 are obtainable in a single punching and stamping operation to manufacture the strip 16 at low cost.

In a free state of the spring 22 (FIG. 6) the tab 36 is inclined relative to the wall portion 20 with the height E of the free tip 44 of the tab 36 relative to the wall portion 20 inferior to the height h of the apex 62 of the motion limiter 34.

The motion limiter 34 serves as a guide during upwardly inserting the fuel rod 4 through the cell 18 on assembling the fuel assembly 2. The motion limiter 34 thus avoids damaging the spring 22 and/or the fuel rod 4 upon insertion of the fuel rod 4 and enhances manufacturability of the fuel assembly 2.

Figure 6:
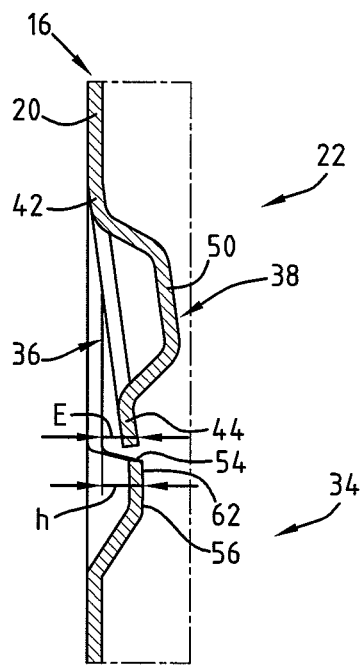
FIG. 6 is a sectional view of the spring and the motion limiter along VI-VI on FIG. 5.
Figure 8:
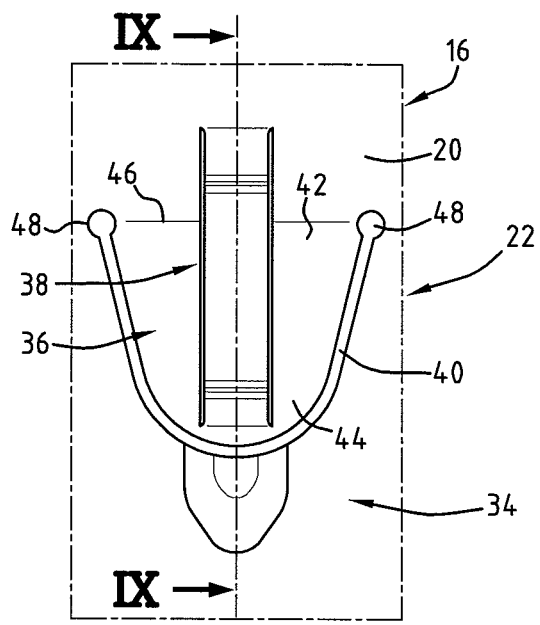
FIGS. 8 and 9 are views corresponding respectively to FIGS. 5 and 6 illustrating another embodiment of the invention.
Figure 9:
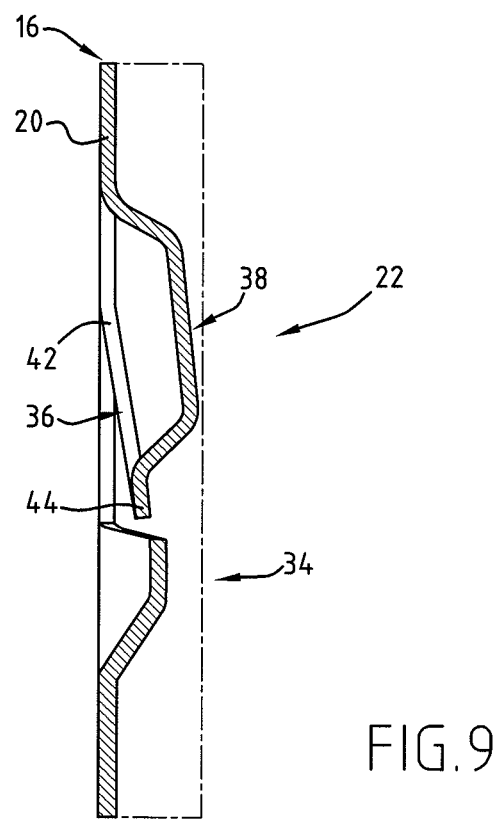

The alternative embodiment of FIGS. 8 and 9 differ from that of FIGS. 5 and 6 by the feature that the contact portion 38 is formed partially in the tab 36 and partially in the wall portion 20. The contact portion 38 is more elongated and steps over the line 46 joining the ends 48 of the slot 40 delimiting the tab 36.

This increases the stiffness of the spring 22 as biasing the spring 22 causes simultaneous deformation of the upper base 42 of the tab 36 and of the upper end of the contact portion 38 about two parallel but different axes.

In the alternative embodiment of FIG. 10, the upstream lower edge 26 of the strip 16 is zigzag-shaped such that it is low at the center of each wall portion 20 and high at the junction between the wall portions 20 where interlaced strips 16 intersect each other.

As a result, a spacer grid 14 may be formed with interlaced strips 16 crossing at cross points 66 at a level higher than the lower points 64, whereby debris possibly present in the coolant fluid are guided transversely towards the cross points 66 at corners of the square shaped cells 18 where the space between the inner surface of the cells 18 and the fuel rods 4 is larger. The debris are thus prevented from damaging the fuel rods 4.

In an alternative embodiment, the lower edge 26 of the strip 16 is zigzag-shaped such that the upstream lower edge 26 is alternatively at a high level and at a low level at the junction between the wall portions 20.

As a result, the interlaced strips 16 may be assembled to provide cross points 66 at a high level and cross points 66 at a low level arranged in staggered rows, with the same benefit.

The lower edge 26 may present a wave shape instead of a zigzag shape.

The invention is applicable to spacer grids for a PWR (Pressurized Water Reactor) fuel assembly or to spacer grids for a BWR (Boiling Water Reactor) fuel assembly as illustrated and also to spacer grids for a VVER (Water-Water Energetic Reactor) fuel assembly.

The invention claimed is:

1. A strip for a nuclear fuel assembly spacer grid comprising interlaced strips defining a lattice of cells for receiving fuel rods and allowing flow of a coolant in a flow direction, the strip comprising:

a wall portion for delimiting a cell;

a spring formed in the strip and provided on the wall portion for forcing a fuel rod extending through the cell away from the wall portion, the spring being cut out in the strip and delimited by a slot; and a motion limiter formed in the strip on the wall portion to limit motion of the fuel rod received in the cell towards the wall portion against action of the spring, the motion limiter being located on an edge of the slot opposite the spring and defines a risen portion on the edge, the motion limiter being rigid, the spring and the motion limiter protruding from the wall portion on a same side of the wall portion.

2. The strip according to claim 1, wherein the motion limiter is provided upstream the spring in the coolant flow direction through the cell delimited by the wall portion.

3. The strip according to claim 1, wherein the motion limiter enlarges towards the edge of the slot.

4. The strip according to claim 1, wherein the motion limiter rises from the wall portion towards the edge of the slot.

5. The strip according to claim 1, wherein the motion limiter is a bulge.

6. The strip according to claim 1, wherein the spring comprises a cantilevered tab.

7. The strip according to claim 6, wherein the tab extends downwardly in cantilevered fashion towards an upstream lower edge of the strip.

8. The strip according to claim 6, wherein the slot is an elongated curved slot, the tab being delimited between the slot and a connection line joining two opposite ends of the slot.

9. The strip according to claim 6, wherein the spring comprises a contact portion at least partially formed in the tab to contact the fuel rod received in the cell.

10. The strip according to claim 9, wherein the contact portion is elongated in the flow direction.

11. A spacer grid comprising:

interlaced strips defining a lattice of cells for receiving fuel rods and allowing flow of a coolant axially upwardly through the spacer grid, at least one of the interlaced strips being the strip as recited in claim 1.

12. A nuclear fuel assembly comprising:

a bundle of fuel rods; and an armature for supporting the fuel rods, the armature comprising at least one of the spacer grids as recited in claim 11.

* * * * *